United States Patent Office 3,061,639
Patented Oct. 30, 1962

3,061,639
METHOD OF PREPARATION OF DIACID-POLYKETONES
Charles Paquot, Paris, and Roger Perron, Chatenay Malabry, France, assignors to Centre National de la Recherche Scientifique, Paris, France, a corporation of France
No Drawing. Filed Mar. 13, 1958, Ser. No. 721,095
Claims priority, application France Mar. 15, 1957
6 Claims. (Cl. 260—537)

Amongst the various methods enabling a ketone function to be obtained, one of the most generally employed consists in causing two molecules of identical or different mono-acids to react at a high temperature in the presence of various metals or metallic oxides, playing the part of catalysts, or in the form of metallic salts in accordance with the following standard reactions:

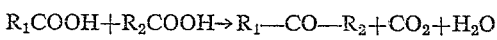

By applying this method to long-chain aliphatic di-acids, cyclic ketones have been obtained, with very low efficiencies, having a large cycle in accordance with the following reaction:

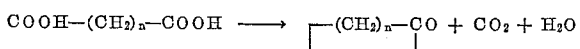

The present invention has for its main object a method of preparation of saturated aliphatic di-acid poly-ketones having long hydrocarbon chains, with simultaneous recovery of the metal employed. In accordance with the invention, the ketonisation is carried out at high temperature of the cadmium salts of the di-acids with as great a purity as possible; this condition generally corresponds approximately to a lower limit of purity equal to about 98%. When carried out under these conditions, the ketonisation is very rapid and results in di-acid poly-ketones in which the number of ketone functions increases with the duration of the reaction and the temperature.

In the text which follows, the number of ketone functions of the di-acid poly-ketone obtained by the present method is termed the "index of ketonisation."

The method is characterised by the fact that the di-acid or the mixture of di-acids is transformed to cadmium salts; that the said salts are brought to a temperature comprised between about 280° and 350° for a time which is fixed according to the index of ketonisation finally desired, the reaction mass being stirred during the operation; and that the resultant product is treated by a strong mineral acid or organic acid or a mixture of acids, in order to liberate the said poly-ketones.

The period of treatment is preferably comprised between 5 and 90 minutes.

The poly-ketones obtained can then be purified when necessary, and the cadmium can be recovered.

In accordance with a further feature of the invention, a di-acid is used which has a degree of condensation in carbon at least equal to 7, or a mixture of various di-acids which have separately such a degree of condensation in carbon. In particular, the mixture obtained by nitric oxidation of fatty substances may be employed, in accordance with the method described in French Patent No. 1,112,068.

In order to convert the di-acid or mixture of di-acids to cadmium salt, this di-acid or this mixture of di-acids can be caused to act on cadmium oxide; it is also possible to work by double decomposition between a soluble salt of the di-acid or of the mixture of di-acids and a soluble salt of cadmium.

In accordance with a further feature of the invention, the acid or the mixture of acids used with a view to isolating the di-acid poly-ketones obtained after the ketonisation reaction may be a strong mineral acid, such for example as sulphuric, nitric or hydrochloric acids, or again an organic acid chosen from the saturated aliphatic acids having less than 5 atoms of carbon, for example acetic acid.

The method is further characterised by the fact that the crude product of ketonisation is treated with the organic acid at the boiling temperature of this latter. In the case of acetic acid, the cadmium is thus converted to soluble cadmium acetate, and the di-acid poly-ketones desired are in general dissolved in the boiling acetic solution. After filtration while hot, which leaves on the filter the highly condensed di-acid poly-ketones and accessorily a little metallic cadmium freed during the reaction, the acetic solution is cooled; the di-acid poly-ketones are precipitated and are separated from the acetic mother-liquors. They are then purified if this is necessary, especially by crystallisation in appropriate solvents.

In order to recover in the form of hydrate the cadmium contained in the acid solutions resulting from the treatment of the crude di-acid poly-ketones by an acid, an alkaline base is used. After precipitation, the cadmium hydrate is isolated, preferably in the form of oxide, and is eventually purified, by standard methods so that it may be re-used in new ketonisation operations.

From the acid mother-liquors, for example from the acetic mother-liquors obtained after separation by filtration of the di-acid poly-ketones, the acid may be recovered, for example the acetic acid, on the one hand, and the cadmium may be re-used on the other hand, by adding a quantity of the di-acid or of the mixture of di-acids to be ketonised, calculated so as to convert the cadmium to di-acid salts, and then by distilling in order to extract the organic acid, for example the acetic acid; the latter may then be purified by rectification if necessary. The residue of the distillation, constituted by the cadmium salt of the di-acid or of the mixture of di-acids, can be directly used in a further ketonisation operation.

If a long-chain saturated aliphatic di-acid is represented by the following general formula:

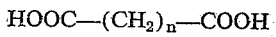

the ketonisation effected in accordance with the present invention results in di-acid poly-ketones according to the global reaction:

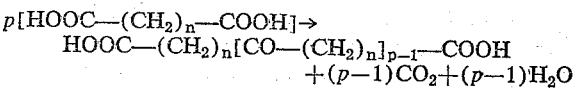

In these formulae, $p$ represents the number of molecules of the initial di-acids used, $n+2$ is the number of carbon atoms of the hydrocarbon chain of the di-acid, and $(p-1)$ is the number of ketone functions of the di-acid poly-ketone obtained, that is to say the index of ketonisation. In fact, for any given ketonisation reaction, $p$ may have several values, and the ketonisation index determined will be an average index.

In accordance with this reaction, the formula of the product resulting from the ketonisation is essentially characterised by saturated intermediate aliphatic hydrocarbon chains which are linked to each other by ketone functions, and are terminated at the two extremities by acid functions, while it is possible for the various hydrocarbon chains to be identical or different, depending on whether the starting compound is a di-acid or a mixture of di-acids.

The index of ketonisation mainly varies with the temperature at which the reaction is carried out, and the duration of the reaction, and increases in a general manner with these two factors.

In practice, the temperature varies between 280° and 350°, and the duration of the reaction is between about 5 minutes and 90 minutes. As a function of these two factors, the index of ketonisation is comprised between about 3 and 30.

If it is observed that the formation of a ketone function is effected between two carboxyls of the di-acids of the four put in reaction, the quantity of cadmium to be added to the di-acids to produce the ketonisation should be as a minimum slightly greater than that necessary to neutralise only half the acid function. In general, the quantity of cadmium employed is that necessary to convert the di-acids to neutral salts.

The duration of the ketonisation reaction will furthermore be a function of the quantity of cadmium employed; in order to obtain a desired result in a minimum time, it is necessary to use the quantity of cadmium required to transform the di-acids into neutral salts.

It will be understood that the recovery of the cadmium is of great advantage from the industrial point of view, and there is therefore considerable benefit to be obtained in using the process indicated above, which consists in treating the organic acid solutions of the cadmium salt (for example the acetic solutions of cadmium acetate) resulting from the treatment of the crude product of the reaction of ketonisation by means of the organic acid (for example acetic acid), by a pre-determined quantity of di-acids to be ketonised, the latter freeing the organic acid, acetic acid for example, and being converted to neutral salt of cadmium which can be directly used to carry out a fresh ketonisation.

The method forming the object of the present invention is applicable to the ketonisation of the cadmium salts of saturated aliphatic di-acids or mixtures of di-acids, whatever may be the length of the hydrocarbon chain, which should however comprise at least seven atoms of carbon.

Generally speaking, during the course of the ketonisation proper, there are however formed in particular cyclic ketones, the quantity of which is very small and which depends on the temperature of the reaction and on the length of the aliphatic hydrocarbon chains of the reactant di-acids. These cyclic ketones are more volatile than linear di-acid poly-ketones, and can be easily extracted by standard methods from the gases formed during the ketonisation phase.

The solubility of di-acid poly-ketones in various usual organic solvents such as acetic acid, acetic esters, butyl oxide, falls very rapidly as their index of ketonisation increases. For high values of this index, a complete insolubility of the di-acid poly-ketones obtained is observed. By suitably choosing the solvents, it is thus possible to separate-out certain constituents from a mixture of di-acid poly-ketones.

It is clear that the di-acid poly-ketones obtained in accordance with the present invention can be used directly or after conversion, by any known means, of the main functions associated wholly or in part with the carbonyls, the two carboxyls and the methylenic chains linking the ketone functions.

By way of indication and without any implied limitation, there have been given below examples of application of the present invention to the case of the preparation of di-acid poly-ketones having a low ketonisation index.

*Example I*

20 parts by weight of sebacic acid (deca-dioic) were converted to a neutral sodium salt in an aqueous solution, and then to a neutral cadmium salt by a reaction of double decomposition in the hot state, with an equivalent solution of a 0.8 molecular cadmium chloride.

The salt is heated to dryness at a temperature of the order of 120–130° in a balloon flask arranged in a metallic bath, provided with a stirring device and surmounted by a small column heated to about 120°, with a lateral pipe for the evacuation of gases.

The mass is then gradually brought up to a temperature of 300° in the metallic bath, which corresponds to the melting temperature of the salt. At this moment, the stirring device is set in operation and the temperature is further increased to 330°–335°, which is maintained for eight minutes. During the course of this phase, a considerable evolution of carbonic acid gas is observed.

After cooling, the dark brown mass is treated by reflux for 30 minutes by 250 parts by weight of crystallisable acetic acid.

5 parts by weight of water are then added and the reflux heating is maintained for 15 minutes.

The solution resulting from this treatment is filtered while hot and leaves on the filter small quantities of insoluble di-acid poly-ketones and metallic cadmium. The filtrate is then cooled, and from this a precipitate separates-out at ambient temperature.

This precipitate is filtered and is then again treated with 500 parts by weight of water at boiling point, refiltered and dried. There are thus obtained 11.25 parts by weight of di-acid poly-ketones having a melting point of 141–144°, an acid index equal to 69, to which corresponds an average molecular mass of 1626, and an average of 10 ketone functions per chain.

The acetic filtrate from which the precipitate was separated is evaporated, and the residue is treated with 500 parts by weight of water at boiling point. After filtration and drying, there were obtained 1.2 parts of di-acid poly-ketone homologues containing a little cadmium, having an acid index of 182 and a melting point comprised between 135° and 150°.

All the small quantities of insoluble di-acid poly-ketones and cadmium which remained on the filter at the beginning of the treatment are attacked by an aqueous, slightly nitric solution with a view to recovering the metal. By this treatment, there was obtained 0.3 part by weight of poly-ketones having a high index of ketonisation.

The nitric filtrate and the various washing waters were collected together, and the cadmium was then extracted with soda in the form of cadmium hydroxide. In this way, a minimum of 90% of the cadmium put into the reaction is recovered.

The efficiency in di-acid poly-ketones is about 85%.

*Example II*

The starting substance, constituted by cadmium sebacate was obtained by evaporating a solution of cadmium acetate at 120–130° while stirring, to which there was added the quantity of sebacic acid calculated so as to obtain neutral sebacate. The figures given below correspond to a quantity of sebacic acid equal to 20 parts by weight. The acetic acid which distils is recovered. The mass thus obtained is stirred for half an hour at a temperature of 150° until the dry state is reached.

The ketonisation reaction was then carried out in the same way as that described in Example I, the reaction time being 12 minutes.

The cooled mass was then attacked with 250 parts by weight of crystallisable acetic acid by reflux for half an hour; 5 parts by weight of water were then added and boiling was continued for a further 15 minutes.

The solution was then evaporated and the excess acetic acid was recovered. The residue containing the di-acid polyketones and the cadmium in the form of acetate was re-treated with 200 parts by weight of water at boiling point, and then filtered. The insoluble fraction was washed with water and dried. This operation thus enabled the di-acid poly-ketones insoluble in water to be separated from the solubilised cadmium acetate.

The insoluble fraction resulting from this treatment, containing all the di-acid poly-ketones and a little metallic cadmium, was extracted at boiling point by 200 parts by weight of an acetic ester such as iso-amyl acetate.

After filtration while hot to separate out the small quantities of insoluble di-acid poly-ketones and cadmium, animal charcoal was added to the filtrate which was then boiled for one hour by reflux, filtered while hot to eliminate the animal charcoal and then cooled to the ambient temperature to crystallise the di-acid poly-ketones. After these have been separated by filtration and drying, there is obtained 11 parts by weight of di-acid poly-ketones having a melting point of 138°, an acid index equal to 72.5 which corresponds to an average molecular mass of 1547, and to the presence of about ten carbonyl functions per chain. The efficiency is 76%.

In addition, it is possible to recover 1.7 parts of di-acid poly-ketones by evaporation of the solvent employed, isoamyl acetate in the example given above.

All the small quantities of insoluble di-acid poly-ketones and cadmium are re-treated with a slightly nitric aqueous solution. After filtration 0.5 part by weight of di-acid poly-ketones insoluble in water were recovered with a solution of cadmium nitrate. This latter is converted to oxide.

The aqueous filtrate containing cadmium acetate, the small quantity of cadmium oxide obtained from the previous treatment and, when so required, a further quantity of this oxide to compensate for the very small losses, are treated with 20 parts by weight of sebacic acid, as indicated in the first paragraph of the present example, with a view to obtaining neutral cadmium sebacate which is then ketonised.

*Example III*

Brassylic acid (tri-deca-dioic) being treated in accordance with the cycle of operations described in Example 1, and its neutral cadmium salt being heated to 335° for 12 minutes, there are obtained di-acid poly-ketones having a melting point of 130–132° and an acid index of 117, which corresponds to an average index of ketonisation of 3.3.

On the other hand, during the course of the ketonisation reaction, there is observed an appreciable formation of cyclic ketone (cyclo-dodecanon) which distils and can be condensed.

*Example IV*

13.5 parts by weight of cadmium oxide are caused to react at 150° with 25 parts by weight of a mixture of di-acids having an acid index of 470 and obtained from the nitric oxidation of fatty substances carried out in accordance with the process described in French Patent No. 1,112,068. There is thus obtained the neutral cadmium salt of this mixture of di-acids. This salt is then treated as in Example I, and results in the production, with an efficiency of 85%, of di-acid poly-ketones having a melting point comprised between 125° and 135°, an acid index between 65 and 80 and a ketonisation index between 6 and 10, depending on the extent to which the duration of the ketonisation process is extended.

The method which forms the object of the invention results in new products from aliphatic di-acid poly-ketones (or derivatives) obtained from the ketonisation of the mixture of di-acids resulting from the nitric oxidation of fatty substances in accordance with the method of French Patent No. 1,112,068. These poly-ketones have the following characteristics:

Melting point _____ 125–135°
Acid index _____ 65–80
Ketonisation index _____ 6 to 10

What we claim is:

1. A method for preparing saturated aliphatic hydrocarbon dicarboxylic acid polyketones from a saturated aliphatic hydrocarbon dicarboxylic acid having from 7 to about 13 carbon atoms, which comprises the steps of heating a cadmium salt of said dicarboxylic acid to a temperature between 280° C. and 350° C. for a period between 5 and 90 minutes accompanied by continuous stirring, and acidifying the resultant reaction mass with a strong mineral acid selected from the group consisting of sulfuric, nitric, and hydrochloric acids to liberate said carboxylic acid polyketones, said polyketones having a ketonization index between 3 and 30.

2. A method as claimed in claim 1, in which the cadmium salt is a neutral cadmium salt of the said dicarboxylic acid, prepared by the double decomposition reaction of a soluble salt of the dicarboxylic acid with a soluble salt of cadmium having a purity at least equal to 98%.

3. A method for preparing saturated aliphatic hydrocarbon dicarboxylic acid polyketones from a saturated aliphatic hydrocarbon dicarboxylic acid having from 7 to about 13 carbon atoms, which comprises the steps of heating a cadmium salt of said dicarboxylic acid to a temperature between 280° C. and 350° C. for a period between 5 and 90 minutes accompanied by continuous stirring, and acidifying the resultant reaction mass with a saturated aliphatic carboxylic acid having less than 5 carbon atoms to liberate said carboxylic acid polyketones, said polyketones having a ketonization index between 3 and 30.

4. A method as claimed in claim 3, in which the cadmium salt is a neutral cadmium salt of the said mixture of dicarboxylic acid, said neutral salt being prepared by the double decomposition reaction of a soluble salt of the said mixture of dicarboxylic acids with a soluble salt of cadmium having a degree of purity at least equal to 98%.

5. A method as claimed in claim 3, in which the organic acid which serves to separate the dicarboxylic acid poly-ketones is acetic acid, whereby said poly-ketones obtained are insoluble in the cold state in an acetic solution of cadmium acetate, and further comprising the step of treating the said solution of cadmium acetate with an alkaline base, and recovering the cadmium in the form of hydroxide.

6. A method as claimed in claim 3, in which the organic acid which serves to separate the dicarboxylic acid poly-ketones is acetic acid whereby said poly-ketones obtained are insoluble in the cold state in an acetic solution of cadmium acetate, and further comprising the steps of: treating the said acetic solution of cadmium acetate with the quantity of dicarboxylic acid necessary to convert the cadmium to a salt of the dicarboxylic acid; recovering the acetic acid produced by distillation, the residue of said distillation being of the neutral cadmium salt of the said dicarboxylic acid; and subjecting said salt to a fresh ketonisation operation.

References Cited in the file of this patent

UNITED STATES PATENTS 2,696,500    Stein _____ Dec. 7, 1954
2,696,501    Stein _____ Dec. 7, 1954

OTHER REFERENCES

Mellor: Comprehensive Treatise on Inorganic and Theoretical Chemistry, vol. 4, page 522 (1923). (Copy in Scientific Library.)

Fieser et al.: Organic Chemistry, 2nd ed., page 314 (1950). (Copy in Scientific Library.)

UNITED STATES PATENT OFFICE
CERTIFICATE OF CORRECTION

Patent No. 3,061,639            October 30, 1962

Charles Paquot et al.

It is hereby certified that error appears in the above numbered patent requiring correction and that the said Letters Patent should read as corrected below.

Column 6, lines 10 and 27, for "carboxylic", each occurrence, read -- di-carboxylic --.

Signed and sealed this 2nd day of April 1963.

(SEAL)
Attest:

ESTON G. JOHNSON

Attesting Officer

DAVID L. LADD

Commissioner of Patents